(12) United States Patent
Kim

(10) Patent No.: US 11,669,935 B2
(45) Date of Patent: Jun. 6, 2023

(54) IMAGE PROCESSING DEVICE AND OPERATING METHOD THEREOF

(71) Applicant: SK hynix Inc., Gyeonggi-do (KR)

(72) Inventor: Dong Ik Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 62 days.

(21) Appl. No.: 17/465,718

(22) Filed: Sep. 2, 2021

(65) Prior Publication Data

US 2022/0301105 A1    Sep. 22, 2022

(30) Foreign Application Priority Data

Mar. 19, 2021  (KR) .................. 10-2021-0036117

(51) Int. Cl.
| | |
|---|---|
| *G06T 3/40* | (2006.01) |
| *G06T 7/246* | (2017.01) |
| *G06V 10/56* | (2022.01) |
| *G06V 10/60* | (2022.01) |
| *H04N 23/80* | (2023.01) |

(52) U.S. Cl.
CPC ............ *G06T 3/4053* (2013.01); *G06T 7/246* (2017.01); *G06V 10/56* (2022.01); *G06V 10/60* (2022.01); *H04N 23/815* (2023.01)

(58) Field of Classification Search
CPC .................. G06T 3/4053; G06T 7/246; G06T 2207/10016; G06T 7/254; G06T 2207/10024; G06T 7/55; G06T 2207/20084; G06T 5/002; G06T 5/003; G06T 2207/20201; G06V 10/56; G06V 10/60; G06V 30/19013; H04N 23/815; H04N 23/60; H04N 25/134; H04N 25/48; H04N 5/144; H04N 23/957; H04N 23/843; H04N 23/68; G06N 3/08; G02B 3/0056; G02B 27/0075
See application file for complete search history.

(56) References Cited

U.S. PATENT DOCUMENTS

| | | | |
|---|---|---|---|
| 8,130,310 B2 * | 3/2012 | Yamamoto | G02B 27/0075 348/340 |
| 8,169,491 B2 * | 5/2012 | Kang | H04N 23/68 348/208.99 |

(Continued)

FOREIGN PATENT DOCUMENTS

KR    1020150139375 A    12/2015

*Primary Examiner* — Lin Ye
*Assistant Examiner* — Tuan H Le
(74) *Attorney, Agent, or Firm* — IP & T Group LLP

(57) ABSTRACT

An image processing device includes: an image sensor for acquiring a pixel value of each of a plurality pixels; and a controller for acquiring a pattern image including the pixel value of each of the plurality of pixels and an exposure value representing an exposure time, generating a plurality of super resolution images based on pixels having the same exposure value among the plurality of pixels included in the pattern image, generating a motion map, which represents a motion of an object based on a ratio of exposure values of pixels at a selected position among a plurality of pixels included in the plurality of super resolution images and a ratio of pixel values of the pixels at the selected position, and generating a target image according to a weighted sum of the plurality of super resolution images and the motion map.

20 Claims, 11 Drawing Sheets

(56) References Cited

U.S. PATENT DOCUMENTS

| | | | |
|---|---|---|---|
| 9,832,389 B2 | 11/2017 | Min et al. | |
| 2014/0192250 A1* | 7/2014 | Mitsunaga | H04N 25/583 348/349 |
| 2015/0015754 A1* | 1/2015 | Fujita | H04N 25/60 348/302 |
| 2015/0062368 A1* | 3/2015 | Li | H04N 25/583 348/222.1 |
| 2015/0244923 A1* | 8/2015 | Lee | H04N 25/583 348/234 |
| 2015/0326806 A1* | 11/2015 | Moriwaka | H04N 25/445 348/302 |
| 2020/0111218 A1 | 4/2020 | Hanwell et al. | |

\* cited by examiner

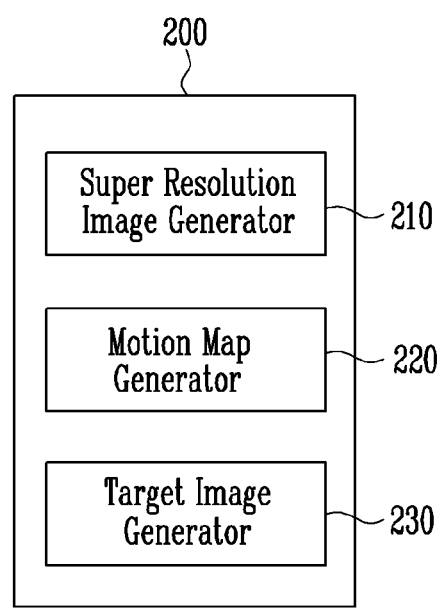

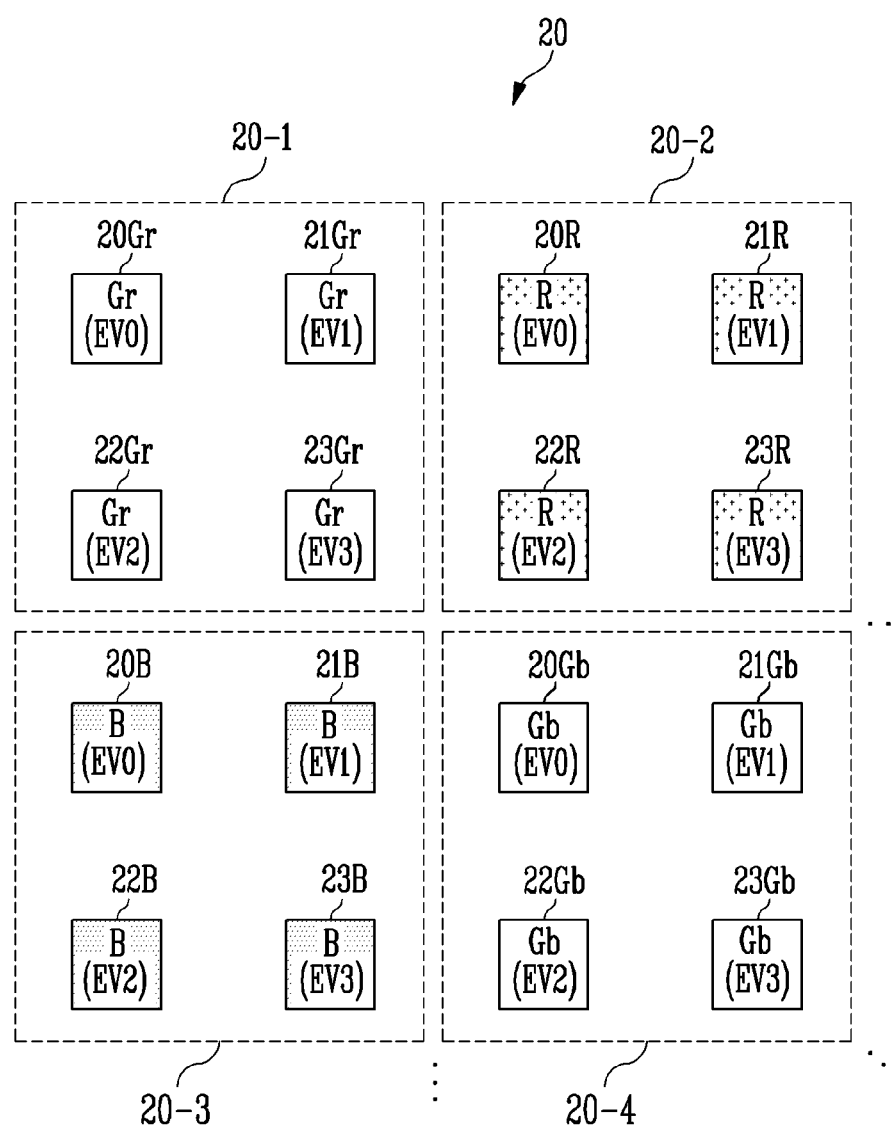

FIG. 7A (1) $ER01(i,j) = \dfrac{Pixel\_EV1(i,j)}{\dfrac{EV1(i,j)}{EV0(i,j)} \times Pixel\_EV0(i,j)}$ (2) $ER12(i,j) = \dfrac{Pixel\_EV2(i,j)}{\dfrac{EV2(i,j)}{EV1(i,j)} \times Pixel\_EV1(i,j)}$ (3) $ER23(i,j) = \dfrac{Pixel\_EV3(i,j)}{\dfrac{EV3(i,j)}{EV2(i,j)} \times Pixel\_EV2(i,j)}$

FIG. 7B (1) $M01(i,j) = \min(abs(ER01(i,j) - 1), 1)$ (2) $M12(i,j) = \min(abs(ER12(i,j) - 1), 1)$ (3) $M23(i,j) = \min(abs(ER23(i,j) - 1), 1)$ (1) $IMG\_EV01(i,j)$
$= M01(i,j) \times \frac{EV1(i,j)}{EV0(i,j)} \times Pixel\_EV0(i,j) + (1 - M01(i,j)) \times Pixel\_EV1(i,j)$ (2) $IMG\_EV12(i,j)$
$= M12(i,j) \times \frac{EV2(i,j)}{EV1(i,j)} \times IMG\_EV01(i,j) + (1 - M12(i,j)) \times Pixel\_EV2(i,j)$ (3) $IMG\_out(i,j)$
$= M23(i,j) \times \frac{EV3(i,j)}{EV2(i,j)} \times IMG\_EV12(i,j) + (1 - M23(i,j)) \times Pixel\_EV3(i,j)$

IMAGE PROCESSING DEVICE AND OPERATING METHOD THEREOF

CROSS-REFERENCE TO RELATED APPLICATION

The present application claims priority under 35 U.S.C. § 119(a) to Korean patent application number 10-2021-0036117 filed on Mar. 19, 2021, the entire disclosure of which is incorporated by reference herein.

BACKGROUND

Field of Invention

The present disclosure generally relates to an electronic device, and more particularly, to an image processing device and an operating method thereof.

Description of Related Art

An image processing device is a device for processing an image to improve image quality. Recently, with the development of computer and communication industries, demands for image processing devices having improved performance have increased in various electronic devices including a smart phone, a digital camera, a game console, the internet of things, a robot, a security camera, a medical camera, and the like.

In particular, various techniques for synthesizing several original images and generating the synthesized images as a final image have recently been researched to improve image quality using an image processing device.

SUMMARY

Embodiments of the present disclosure provide an image processing device for generating an image having improved image quality by distinguishing an area in which a motion occurs and an area in which the motion does not occur from each other, and an operating method of the image processing device.

In accordance with an aspect of the present disclosure, there is provided an image processing device including: an image sensor configured to acquire a pixel value of each of a plurality pixels; and a controller configured to acquire a pattern image including the pixel value of each of the plurality of pixels and an exposure value representing an exposure time for which the pixel value is acquired, generate a plurality of super resolution images based on pixels having the same exposure value among the plurality of pixels included in the pattern image, generate a motion map, which represents a motion of an object based on a ratio of exposure values of pixels at a selected position among a plurality of pixels included in the plurality of super resolution images and a ratio of pixel values of the pixels at the selected position among the plurality of pixels included in the plurality of super resolution images, and generate a target image according to a weighted sum of the plurality of super resolution images and the motion map.

In accordance with another aspect of the present disclosure, there is provided a method for operating an image processing device, the method including: acquiring a pattern image including a pixel value of each of a plurality of pixels and an exposure value representing an exposure time for which the pixel value is acquired; generating a plurality of super resolution images based on pixels having the same exposure value among the plurality of pixels included in the pattern image; generating a motion map, which represents a motion of an object based on a ratio of exposure values of pixels at a selected position among a plurality of pixels included in the plurality of super resolution images and a ratio of pixel values of the pixels at the selected position among the plurality of pixels included in the plurality of super resolution images; and generating a target image according to a weighted sum of the plurality of super resolution images and the motion map.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 2B is a diagram illustrating a controller in accordance with an embodiment of the present disclosure.

FIG. 3 is a diagram illustrating a pattern image in accordance with an embodiment of the present disclosure.

FIG. 7A is a diagram illustrating a method for calculating an exposure ratio in accordance with an embodiment of the present disclosure.

FIG. 7B is a diagram illustrating a method for generating a motion map in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Hereinafter, embodiments of the present disclosure will be described in detail with reference to the accompanying drawings in order for those skilled in the art to be able to readily implement the technical spirit of the present disclosure.

Figure 1:
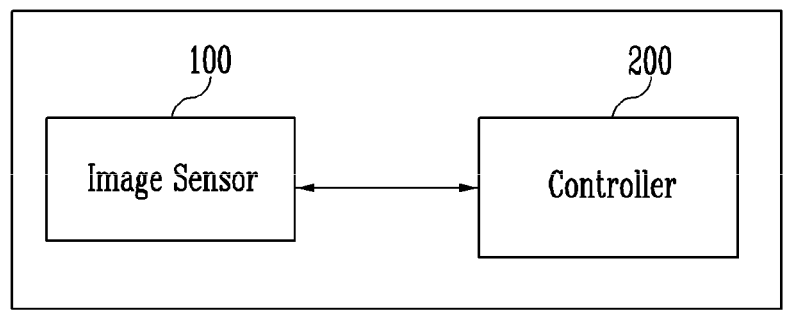
FIG. 1 is a diagram illustrating an image processing device in accordance with an embodiment of the present disclosure.

FIG. 1 is a diagram illustrating an image processing device 1000 in accordance with an embodiment of the present disclosure.

Referring to FIG. 1, the image processing device 1000 may include an image sensor 100 and a controller 200. The image sensor 100 and the controller 200 may be implemented as individual chips separated from each other or be implemented as a single integrated chip.

The image processing device 1000 may be implemented as various electronic devices. For example, the image processing device 1000 may be implemented as a digital camera, a mobile device, a smart phone, a personal computer (PC), a tablet PC, a notebook, a personal digital assistant (PDA), an enterprise digital assistant (EDA), a portable multimedia player (PMP), a wearable device, a black box, a robot, etc. In another embodiment, the image processing device 1000 may be implemented as a packaged component. The image processing device 1000 may be included in various electronic devices.

The image sensor 100 may acquire a pixel value of each of a plurality of pixels. Specifically, the image sensor 100 may acquire a pixel value by converting light incident into each of the plurality of pixels into an electrical signal. The image sensor 100 may acquire an image through the pixel value of each of the plurality of pixels. The pixel may represent a unit constituting an image. That is, the image may include a plurality of pixels. To this end, the image sensor 100 may be implemented as a Charge Coupled Device (CCD) sensor or a Complementary Metal Oxide Semiconductor (CMOS) sensor.

Various pixel data may be mapped to the pixel. The pixel data may include information representing at least one of a position of the pixel, a color of the pixel, a pixel value (PV), and an exposure value (EV) of the pixel. The concepts of the pixel and the pixel data may be equally applied to a pattern image, a super resolution image, and a target image, which will be described later.

The plurality of pixels may include individual pixels. Any pixel among the plurality of pixels may be represented as a pixel (i, j). Here, each of i and j is a natural number, and i and j may represent a position at which the corresponding pixel is arranged in a row direction and a column direction. The pixel (i, j) may represent a pixel located on an ith row in the row direction and a jth column in the column direction.

The color of the pixel may represent one of red, green, and blue. The image may express a color through one point pixel obtained by combining a pixel of red, a pixel of green, and a pixel of blue.

The pixel value may represent brightness of a pixel. For example, a corresponding pixel may represent a higher brightness as the pixel value is a larger value. The image may be visually displayed through a display device (not shown) according to the color of the pixel and the pixel value.

The image sensor 100 may acquire a pattern image through the pixel value of each of the plurality of pixels. The pattern image may represent an image having a pattern in which a group to which pixels of a first color belong, a group to which pixels of a second color belong, and a group to which pixels of third color belong are alternately arranged in the column and row directions. The first color, the second color, and the third color are different colors, and each of the first color, the second color, and the third color may be one color among red, green, and blue. Each group to which pixels belong may be located in each local area.

The exposure value of a pixel may represent an exposure time. For example, the exposure value may be a value calculated as a multiplication of an exposure time, an analog gain value, and a digital gain value. The exposure time may be an amount of time for which light is sensed in an area corresponding to a pixel, within the image sensor 100. A plurality of pixels may have the same exposure value according to positions thereof. For example, a pixel (1, 1), a pixel (1, 3), a pixel (1, 5), . . . may have the same first exposure value. A pixel (1, 2), a pixel (1, 4), a pixel (1, 6), . . . may have the same second exposure value. The first exposure value is a value different from the second exposure value.

The controller 200 may acquire a pattern image. For example, the controller 200 may acquire a pattern image by receiving the pattern image from the image sensor 100. In another example, the controller 200 may receive pixel data of each of the plurality of pixels from image sensor 100, and acquire a pattern image through the received pixel data of each of the plurality of pixels. The pattern image may include a plurality of pixels. The pixel data mapped to each of the plurality of pixels may include information representing at least one of a position of the pixel, a color of the pixel, a pixel value of the pixel, and an exposure value of the pixel. The exposure value of the pixel may be included in an image itself, or may be included in meta data of the image as data separate from the image.

The controller 200 may generate a plurality of super resolution images, based on pixels having the same exposure value among the plurality of pixels of the pattern image. Each of the plurality of super resolution images may represent an image generated based on a pixel having a specific exposure value. For example, a first super resolution image may be generated based on a pixel having the first exposure value, and a second super resolution image may be generated based on a pixel having the second exposure value different from the first exposure value. In addition, each of a plurality of pixels included in a super resolution image may have an individual pixel value acquired according to the same exposure value.

The controller 200 may generate super resolution images, a number of which is equal to that of different exposure values of the pattern image. For example, when the number of different exposure values among exposure values of the plurality of pixels included in the pattern image is 4, the controller 200 may generate 4 super resolution images.

Each super resolution image may include a plurality of pixels. Any pixel among the plurality of pixels may be represented as a pixel (i, j). Here, each of i and j is a natural number.

In an embodiment, the super resolution image may be an image having a resolution higher than that of the pattern image. The resolution may represent a number of point pixels obtained by combining a pixel of red, a pixel of green, and a pixel of blue with respect to each of lateral and longitudinal directions. For example, when 1920 point pixels exist in the lateral direction and 1080 point pixels exist in the longitudinal direction, the resolution may be represented as 1920×1080. That the resolution is high means that the number of point pixels with respect to each of the lateral and longitudinal directions becomes large.

The controller 200 may generate at least one motion map, based on a ratio of exposure values and a ratio of pixel values between the plurality of super resolution images. The motion map may represent a degree to which a motion of an object occurs. When the plurality of super resolution images are four super resolution images, i.e., a first super resolution image, a second super resolution image, a third super resolution image, and a fourth super resolution image, a first motion map may be generated based on a pixel value and an exposure value between the first super resolution image and the second super resolution image, a second motion map may be generated based on a pixel value and an exposure value between the second super resolution image and the third super resolution image, and a third motion map may be generated based on a pixel value and an exposure value between the third super resolution image and the fourth super resolution image. Each motion map may include a plurality of motion cells. Any motion cell among the plurality of motion cells may be represented as a motion cell (i, j). Here, each of i and j is natural number. The motion cell (i, j) may have the same position relationship as the pixel (i, j) of the super resolution image.

A case where the first super resolution image and the second super resolution image among the plurality of super resolution images are included, based on the pixel (i, j) at the same position between the plurality of super resolution images will be described. As an example, an exposure value of the first super resolution image is smaller than that of the second super resolution image.

The ratio of exposure values refers to a ratio of an exposure value of the pixel (i, j) in the first super resolution image and an exposure value of the pixel (i, j) in the second super resolution image, and the ratio of pixel values refers to a ratio of a pixel value of the pixel (i, j) in the first super resolution image and a pixel value of the pixel (i, j) in the second super resolution image. The controller 200 may generate a motion cell (i, j) by using the above-described ratio of the exposure values and the above-described ratio of the pixel values. The motion cell (i, j) may have a value within a predetermined range. The predetermined range may be a range which is greater than or equal to 0 and is less than or equal to 1. That the value of the motion cell (i, j) becomes closer to 0 may represent that any motion does not occur in the pixel (i, j). That the value of the motion cell (i, j) becomes closer to 1 may represent that a motion occurs in the pixel (i, j). The controller 200 may generate a motion map corresponding to all of the plurality of pixels by repeating the above-described operation on each of the plurality of pixels.

The controller 200 may generate a target image, based on at least one motion map and pixel values of the plurality of super resolution images. The target image may represent an image generated as a result obtained by performing image processing on the pattern image to improve the image quality of the pattern image. The controller 200 may output the target image to the display device such that the target image is displayed through the display device.

The target image may include a plurality of pixels. Any pixel among the plurality of pixels may be represented as a pixel (i, j). Here, each of i and j is a natural number. The pixel (i, j) of the target image may have the same position relationship as the pixel (i, j) of the super resolution image and the motion cell (i, j) of the motion map.

A case where the first super resolution image and the second super resolution image among the plurality of super resolution images are included, based on the pixel (i, j) at the same position between the plurality of super resolution images will be described. The controller 200 may perform a weighted operation using, as a weight, a motion value of the motion cell (i, j) with respect to the pixel value of the pixel (i, j) in the first super resolution image and the pixel value of the pixel (i, j) in the second super resolution image. The controller 200 may acquire a pixel value of the pixel (i, j) of the target image as a result value of the weighted operation. The controller 200 may acquire a pixel value of all the pixels by repeating the above-described operation on each of the plurality of pixels, and generate a target image through all pixel data.

In accordance with the present disclosure, there can be provided an image processing device for generating a target image having improved image quality while reducing noise with respect to a texture portion such as an edge of a background, which may be mistaken as a motion of an object, and an operating method of the image processing device.

Hereinafter, the embodiment of the present disclosure will be described in detail with reference to the accompanying drawings.

Figure 2A:
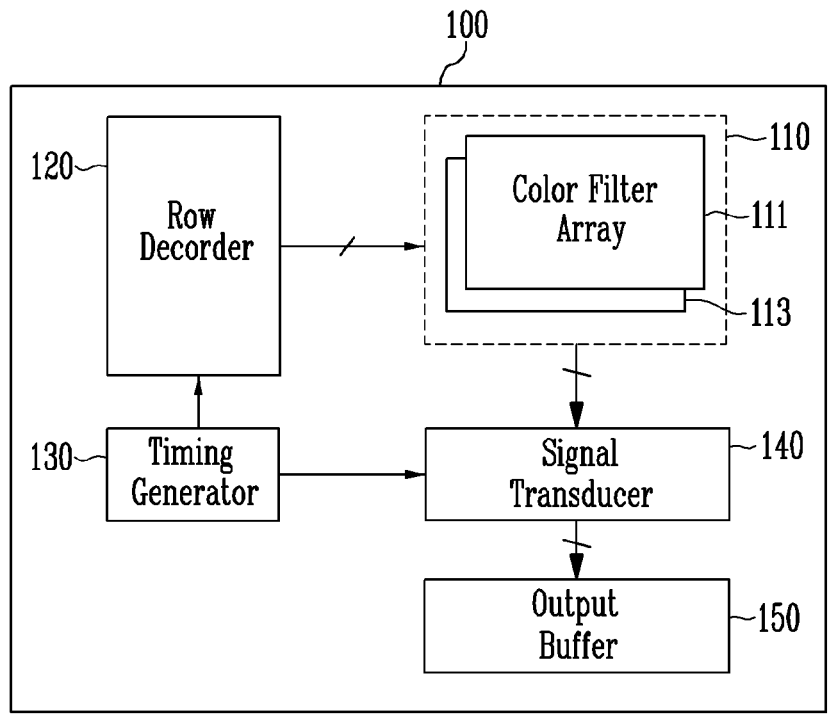
FIG. 2A is a diagram illustrating an image sensor in accordance with an embodiment of the present disclosure.

FIG. 2A is a diagram illustrating an image sensor 100 in accordance with an embodiment of the present disclosure.

Referring to FIG. 2A, the image sensor 100 may include a pixel array 110, a row decoder 120, a timing generator 130, a signal transducer 140, and an output buffer 150.

The pixel array 110 may include a color filter array 111 and a photoelectric conversion layer 113. The color filter array 111 may be disposed on the top of the photoelectric conversion layer 113. The photoelectric conversion layer 113 may be disposed on the bottom of the color filter array 111. The top and the bottom are defined based on the advancing direction of light, and the light may advance in a direction from the color filter array 111 to the photoelectric conversion layer 113.

The color filter array 111 may include a plurality of color filters. Each of the plurality of color filters may be one of an R color filter, a G color filter, and a B color filter. The R color filter may filter incident light to allow light exhibiting a red color to be transmitted therethrough. The G color filter may filter incident light to allow light exhibiting a green color to be transmitted therethrough. The B color filter may filter incident light to allow light exhibiting a blue color to be transmitted therethrough.

The photoelectric conversion layer 113 may include a plurality of sensing circuits. The sensing circuit may include a photo diode and a capacitor. The photo diode may generate a current with respect to incident light through the photoelectric effect. The capacitor may accumulate charges according to the current generated by the photo diode. The quantity of the accumulated charges may correspond to a pixel value representing brightness.

The pixel array 110 may include sensing areas corresponding to a plurality of pixels. Each sensing area is an area which can independently sense light, and may include a color filter of the color filter array 111 and a sensing circuit of the photoelectric conversion layer 113. The sensing areas may be arranged in the row direction and the column direction.

In an embodiment, the pixel array 110 may further include a lens disposed on the top of the color filter array 111 to refract light. The lens may be configured with a single lens layer or a plurality of lens layers, forming an optical system for refracting light. Each lens layer may be configured as a micro lens of a sensing area unit.

The row decoder 120 may select a sensing area located on a row corresponding to an address in response to the address and control signals, which are output from the timing generator 130. The pixel array 110 may output a signal corresponding to the quantity of charges accumulated in the selected sensing area, and provide the signal to the signal transducer 140.

The signal transducer 140 may acquire pixel data of each of the plurality of pixels, based on each of signals output from the pixel array 110. The pixel data may include a pixel value and a color. For example, as for one pixel, the signal transducer 140 may acquire a pixel value corresponding to the quantity of charges accumulated in a capacitor in the photoelectric conversion layer 113 and a color corresponding to a color filter in the color filter array 111.

The output buffer 150 may be implemented with a plurality of buffers for storing digital signals output from the signal transducer 140. Specifically, the output buffer 150 may latch and output each pixel data of a column unit, provided from the signal transducer 140. The output buffer 150 may temporarily store the pixel data output from the signal transducer 140, and sequentially output the pixel data under the control of the timing generator 130. In accordance with an embodiment of the present disclosure, the output buffer 150 may be omitted.

The image sensor 100 may acquire a pixel value of a pixel corresponding to a sensing area, based on the quantity of charges accumulated according to light incident into the sensing area for an exposure time. An individual exposure time may be set in the sensing area. That is, an exposure value representing the exposure time may be set in the pixel corresponding to the sensing area.

The pixel value may be determined according to an amount of incident light. For example, although light has the same intensity, the pixel value may increase when the exposure time becomes longer.

The quantity of charges cannot be accumulated more than a charge capacity of the capacitor. Hence, when there exists a sensing area in which the quantity of charges reaches a predetermined reference value, it may be defined that a pixel corresponding to the sensing area has been saturated. When the pixel is saturated, the motion value of a motion cell at the same position as the saturated pixel may be processed as 0.

FIG. 2B is a diagram illustrating a controller 200 in accordance with an embodiment of the present disclosure.

Referring to FIG. 2B, the controller 200 may include a super resolution image generator 210, a motion map generator 220, and a target image generator 230. The super resolution image generator 210, the motion map generator 220, and the target image generator 230 may be implemented as a software module which allows the controller 200 to perform a corresponding operation. However, the present disclosure is not limited thereto, and the super resolution image generator 210, the motion map generator 220, and the target image generator 230 may be implemented as a hardware module which autonomously performs the corresponding operation.

The super resolution image generator 210 may generate a plurality of super resolution images, based on pixels having the same exposure value among a plurality of pixels included in a pattern image.

In an embodiment, the super resolution image generator 210 may extract pixels having a first exposure value and pixels having a second exposure value among the plurality of pixels included in the pattern image. The first exposure value and the second exposure value may be different values.

The super resolution image generator 210 may generate a first super resolution image including a first plurality of pixels, in which the pixels having the first exposure value are alternately arranged according to a color, among the plurality of super resolution images. Also, the super resolution image generator 210 may generate a second super resolution image including a second plurality of pixels, in which the pixels having the second exposure value are alternately arranged according to a color, among the plurality of super resolution images.

The super resolution image generator 210 may generate a plurality of super resolution images through a super resolution technique, based on pixels having the same exposure value among the plurality of pixels included in the pattern image. The super resolution technique may include at least one of a bilinear interpolation technique, a bicubic interpolation technique, and a deep learning-based convolution neural network.

The bilinear interpolation technique represents a linear interpolation technique with respect to each of an x-axis and a y-axis. The linear interpolation technique is a technique of obtaining a position of a target point by using a distance ratio of two known points, when three points have a linear relationship when positions of two points among the third points are known, and an accurate position of the target point is not known. The bicubic interpolation technique is a technique of forming a gradation by introducing an average value of pixel values included in pixels of a previous image and pixel values of pixels at the periphery thereof. The convolution neural network refers to a technique of recovering an image through a multi-network learned to output a high resolution image from the input of a low resolution image.

When the pattern image has a number of exposure values greater than that of the above-described case, the super resolution image generator 210 may generate a larger number of super resolution images by operating in the same manner as described above. This will be described in detail with reference to FIGS. 4A to 4D.

The motion map generator 220 may generate a motion map representing a motion of an object, based on a ratio of exposure values of pixels located at a selected position among a plurality of pixels included in the plurality of super resolution images and a ratio of pixel values of the pixels located at the selected position among the plurality of pixels included in the plurality of super resolution images.

In an embodiment, the motion map generator 220 may select pixels at the same position according to an address of a pixel among the first plurality of pixels included in the first super resolution image and the second plurality of pixels included in the second super resolution image. The motion map generator 220 may calculate a ratio of exposure values of the selected pixels at the same position and a ratio of pixel values of the selected pixels at the same position.

The motion map generator 220 may calculate each of the motion values at the selected position, based on the ratio of exposure values of the selected pixels at the same position and the ratio of pixel values of the selected pixels at the same position. When at least one of the selected pixels at the same position among the first plurality of pixels and the second plurality of pixels is saturated, the motion map generator 220 may calculate, as 0, a motion value corresponding to the saturated pixel. The motion map generator 220 may generate a motion map including the calculated motion values.

When a number of super resolution images greater than that of the above-described case are generated, the motion map generator 220 may generate a larger number of motion maps by operating in the same manner as described above. This will be described in detail with reference to FIGS. 6 to 7B.

The target image generator 230 may generate a target image according to a weighted sum of the plurality of super resolution images and the motion maps.

The target image generator 230 may select pixels at the same position according to an address of a pixel among the first plurality of pixels included in the first super resolution image and the second plurality of pixels included in the second super resolution image. The target image generator 230 may select a motion value at the same position as the selected pixel among a plurality of motion values included in a motion map.

The target image generator 230 may calculate a sum of each of the pixel values of the selected pixels at a selected position, the pixel values being weighted by a corresponding motion value at the selected position. The target image generator 230 may generate a target image by mapping the weighted sum at the selected position to a pixel value of a pixel at the selected position among a plurality of pixels included in the target image.

When the number of super resolution images and motion maps, greater than those of the above-described case, are generated, the target image generator 230 may generate a target image through a weighted sum in a manner similar to that described above. This will be described in detail with reference to FIGS. 8 and 9.

FIG. 3 is a diagram illustrating a pattern image in accordance with an embodiment of the present disclosure.

Referring to FIG. 3, the controller 200 may acquire a pattern image 20 including a pixel value and an exposure value of each of a plurality of pixels. FIG. 3 represents a portion of the pattern image 20, and the pattern image 20 may further include a plurality of other pixels which are repeatedly arranged as shown in FIG. 3.

The pattern image 20 may include a plurality of local areas 20-1, 20-2, 20-3, and 20-4. That is, the pattern image 20 may be divided in units of local areas. Each of the plurality of local areas 20-1, 20-2, 20-3, and 20-4 may include a plurality of pixels.

Each of the plurality of local areas 20-1, 20-2, 20-3, and 20-4 may include a plurality of pixels having the same color. For example, a first local area 20-1 may include a plurality of Gr pixels 20Gr, 21Gr, 22Gr, and 23Gr which represent a green color. A second local area 20-2 may include a plurality of R pixels 20R, 21R, 22R, and 23R which represent a red color. A third local area 20-3 may include a plurality of B pixels 20B, 21B, 22B, and 23B which represent a blue color. A fourth local area 20-4 may include a plurality of Gb pixels 20Gb, 21Gb, 22Gb, and 23Gb which represent a green color.

In an embodiment, the plurality of pixels included in each of the plurality of local areas 20-1, 20-2, 20-3, and 20-4 may be arranged according to an n×n array in a corresponding local area. Here, n is a natural number. For example, n may be a value of 2, 3 or the like. In another embodiment, the plurality of pixels included in each of the plurality of local areas 20-1, 20-2, 20-3, and 20-4 may be arranged according to an m×n array in a corresponding local area. Here, each of m and n is a natural number.

Each of the plurality of local areas 20-1, 20-2, 20-3, and 20-4 may include a plurality of pixels having different exposure values.

For example, the first local area 20-1 may include a first Gr pixel 20Gr having a first exposure value EV0, a second Gr pixel 21Gr having a second exposure value EV1, a third Gr pixel 22Gr having a third exposure value EV2, and a fourth Gr pixel 23Gr having a fourth exposure value EV3. The second local area 20-2 may include a first R pixel 20R having the first exposure value EV0, a second R pixel 21R having the second exposure value EV1, a third R pixel 22R having the third exposure value EV2, and a fourth R pixel 23R having the fourth exposure value EV3. The third local area 20-3 may include a first B pixel 20B having the first exposure value EV0, a second B pixel 21B having the second exposure value EV1, a third B pixel 22B having the third exposure value EV2, and a fourth B pixel 23B having the fourth exposure value EV3. The fourth local area 20-4 may include a first Gb pixel 20Gb having the first exposure value EV0, a second Gb pixel 21Gb having the second exposure value EV1, a third Gb pixel 22Gb having the third exposure value EV2, and a fourth Gb pixel 23Gb having the fourth exposure value EV3.

In an embodiment, pixels relatively located at the same position in a local area may have the same exposure value. For example, the Gr pixel 20Gr, the R pixel 20R, the B pixel 20B, and the Gb pixel 20Gb, which are located at (1, 1) in each of the first to fourth local areas 20-1 to 20-4, may have the same first exposure value EV0.

Each pixel may include a pixel value acquired according to an exposure value set therein. For example, when the first exposure value EV0 represents an exposure time of 4 ms, the pixel value of the first Gr pixel 20Gr may be a pixel value acquired through light sensed for 4 ms in a sensing area corresponding to the first Gr pixel 20Gr.

The plurality of pixels included in each of the plurality of local areas 20-1, 20-2, 20-3, and 20-4 may all have different exposure values as shown in FIG. 3. However, this is merely an example. Alternatively, only some of the plurality of pixels included in each of the plurality of local areas 20-1, 20-2, 20-3, and 20-4 may have different exposure values.

Hereinafter, a method for generating a super resolution image, a motion map, and a target image, based on the pattern image 20 shown in FIG. 3, is illustrated.

FIGS. 4A to 4D are diagrams illustrating a method for generating a super resolution image in accordance with an embodiment of the present disclosure.

Referring to FIGS. 4A to 4D, the controller 200 may generate a plurality of super resolution images 30, 31, 32, and 33, based on pixels having the same exposure value in the pattern image 20. The plurality of super resolution images 30, 31, 32, and 33 may include a first super resolution image 30, a second super resolution image 31, a third super resolution image 32, and a fourth super resolution image 33.

Figure 4A:
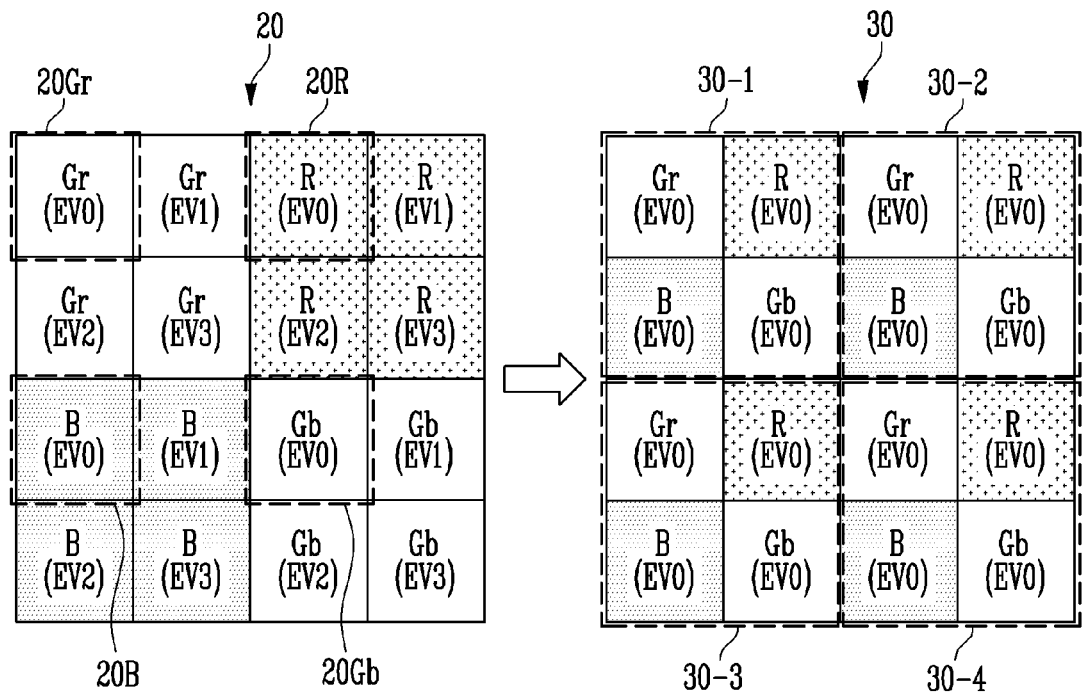
FIGS. 4A to 4D are diagrams illustrating a method for generating a super resolution image in accordance with an embodiment of the present disclosure.

Referring to FIG. 4A, the controller 200 may extract a first Gr pixel 20Gr, a first R pixel 20R, a first B pixel 20B, and a first Gb pixel 20Gb, which have the same first exposure value EV0, among the plurality of pixels included in the pattern image 20.

The controller 200 may generate the first super resolution image 30 in which the extracted first Gr pixel 20Gr, the extracted first R pixel 20R, the extracted first B pixel 20B, and the extracted first Gb pixel 20Gb are disposed. That is, the first super resolution image 30 may include the first Gr pixel 20Gr, the first R pixel 20R, the first B pixel 20B, and the first Gb pixel 20Gb, which have the same first exposure value EV0.

Specifically, the controller 200 may generate the first super resolution image 30 in which the extracted first Gr pixel 20Gr, the extracted first R pixel 20R, the extracted first B pixel 20B, and the extracted first Gb pixel 20Gb are repeatedly disposed. For example, the extracted first Gr pixel 20Gr, the extracted first R pixel 20R, the extracted first B pixel 20B, and the extracted first Gb pixel 20Gb may be respectively disposed in a first area 30-1, a second area 30-2, a third area 30-3, and a fourth area 30-4. Positions of the first to fourth areas 30-1 to 30-4 of the first super resolution image 30 may correspond to those of the first to fourth local areas 20-1 to 20-4 as areas to which the pixels extracted from the pattern image 20 belong.

Each of the plurality of super resolution images 30, 31, 32, and 33 may be an image having a resolution higher than that of the pattern image 20. For example, in the case of the pattern image 20 shown in FIG. 3, 16 pixels representing red, green, and blue are adjacent to each other, to constitute one point pixel. In the case of the first super resolution image 30 shown in FIG. 4A, 4 pixels representing red, green, and blue are adjacent to each other, to constitute one point pixel. The pattern image 20 may have a resolution of 1×1 according to a number of point pixels disposed, and the first super resolution image 30 may have a resolution of 2×2 according to a number of point pixels disposed. As described above, the controller 200 in accordance with the embodiment of the present disclosure may generate the super resolution image 30 having a resolution higher than that of the pattern image 20 through the pattern image 20.

Figure 4B:
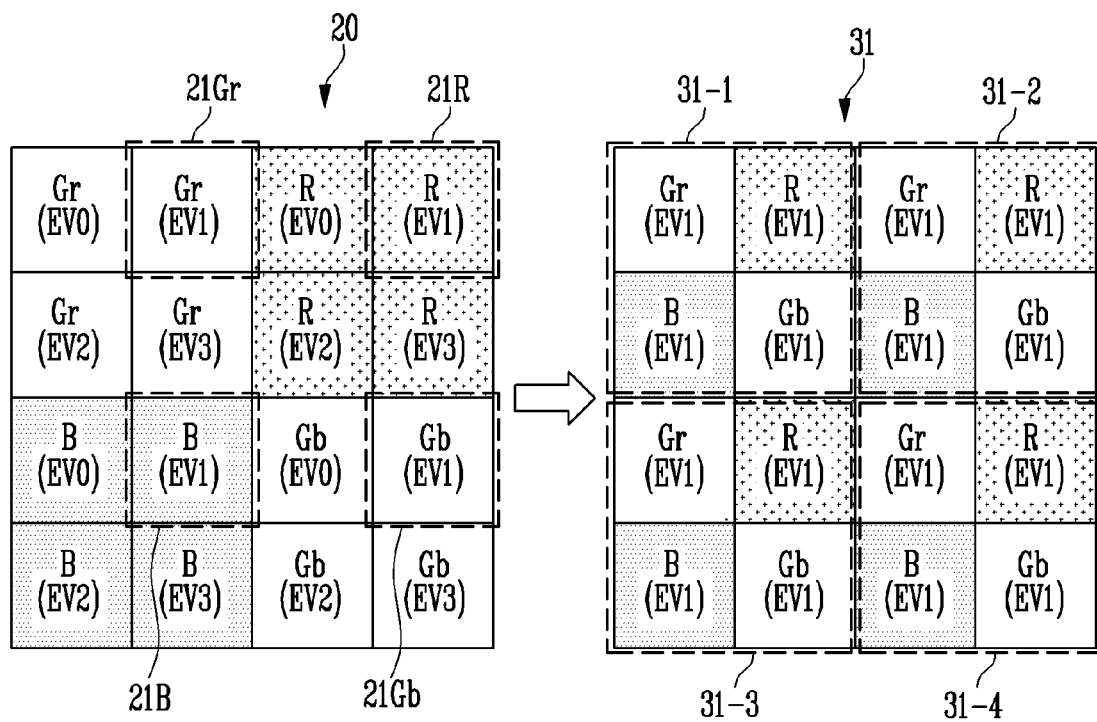

Referring to FIG. 4B, the controller 200 may extract a second Gr pixel 21Gr, a second R pixel 21R, a second B pixel 21B, and a second Gb pixel 21Gb, which have the same second exposure value EV1, among the plurality of pixels included in the pattern image 20.

The controller 200 may generate the second super resolution image 31 in which the extracted second Gr pixel 21Gr, the extracted second R pixel 21R, the extracted second B pixel 21B, and the extracted second Gb pixel 21Gb are disposed. That is, the second super resolution image 31 may include the second Gr pixel 21Gr, the second R pixel 21R, the second B pixel 21B, and the second Gb pixel 21Gb, which have the same second exposure value EV1.

For example, the controller 200 may generate the second super resolution image 31 in which the extracted second Gr pixel 21Gr, the extracted second R pixel 21R, the extracted second B pixel 21B, and the extracted second Gb pixel 21Gb are respectively disposed in a first area 31-1, a second area 31-2, a third area 31-3, and a fourth area 31-4.

Figure 4C:
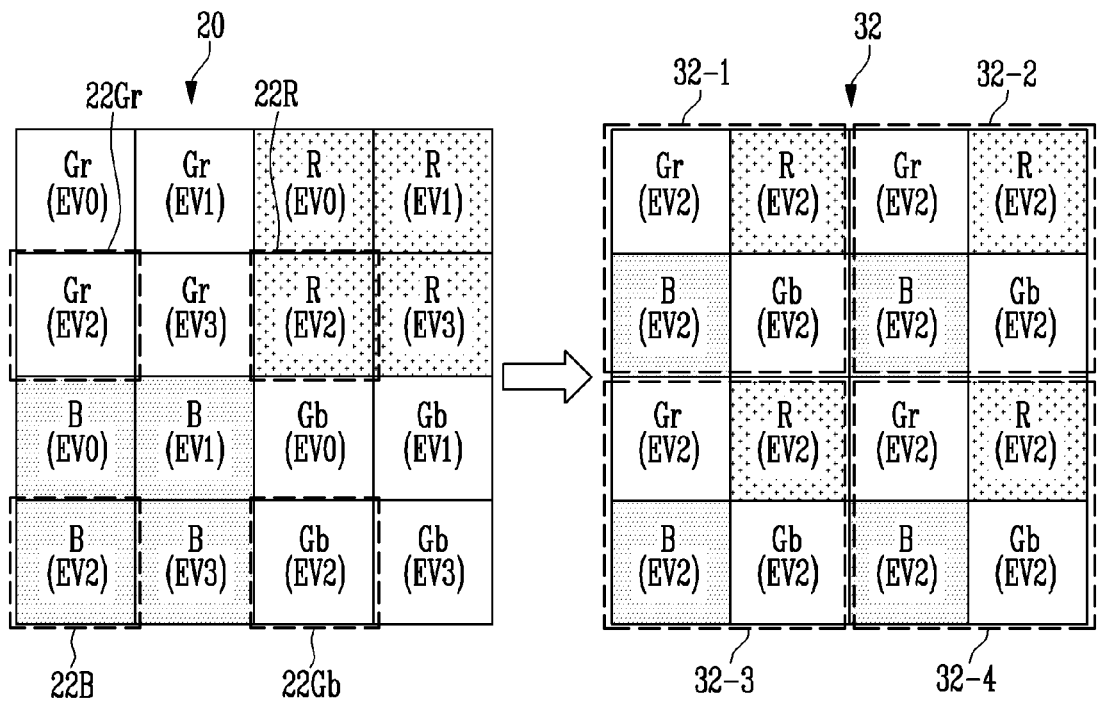

Referring to FIG. 4C, the controller 200 may extract a third Gr pixel 22Gr, a third R pixel 22R, a third B pixel 22B, and a third Gb pixel 22Gb, which have the same third exposure value EV2, among the plurality of pixels included in the pattern image 20.

The controller 200 may generate the third super resolution image 32 in which the extracted third Gr pixel 22Gr, the extracted third R pixel 22R, the extracted third B pixel 22B, and the extracted third Gb pixel 22Gb are disposed. That is, the third super resolution image 32 may include the third Gr pixel 22Gr, the third R pixel 22R, the third B pixel 22B, and the third Gb pixel 22Gb, which have the same third exposure value EV2.

For example, the controller 200 may generate the third super resolution image 32 in which the extracted third Gr pixel 22Gr, the extracted third R pixel 22R, the extracted third B pixel 22B, and the extracted third Gb pixel 22Gb are respectively disposed in a first area 32-1, a second area 32-2, a third area 32-3, and a fourth area 32-4.

Figure 4D:
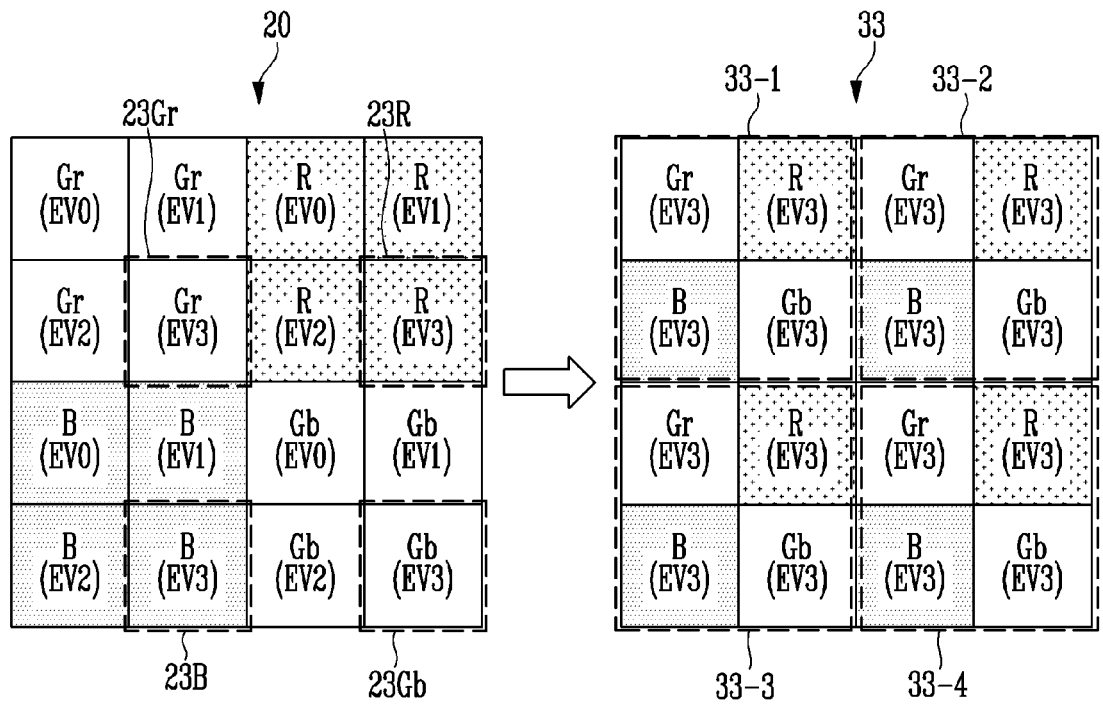

Referring to FIG. 4D, the controller 200 may extract a fourth Gr pixel 23Gr, a fourth R pixel 23R, a fourth B pixel 23B, and a fourth Gb pixel 23Gb, which have the same fourth exposure value EV3, among the plurality of pixels included in the pattern image 20.

The controller 200 may generate the fourth super resolution image 33 in which the extracted fourth Gr pixel 23Gr, the extracted fourth R pixel 23R, the extracted fourth B pixel 23B, and the extracted fourth Gb pixel 23Gb are disposed. That is, the fourth super resolution image 32 may include the fourth Gr pixel 23Gr, the fourth R pixel 23R, the fourth B pixel 23B, and the fourth Gb pixel 23Gb, which have the same fourth exposure value EV3.

For example, the controller 200 may generate the fourth super resolution image 33 in which the extracted fourth Gr pixel 23Gr, the extracted fourth R pixel 23R, the extracted fourth B pixel 23B, and the extracted fourth Gb pixel 23Gb are respectively disposed in a first area 33-1, a second area 33-2, a third area 33-3, and a fourth area 33-4.

Figure 5:
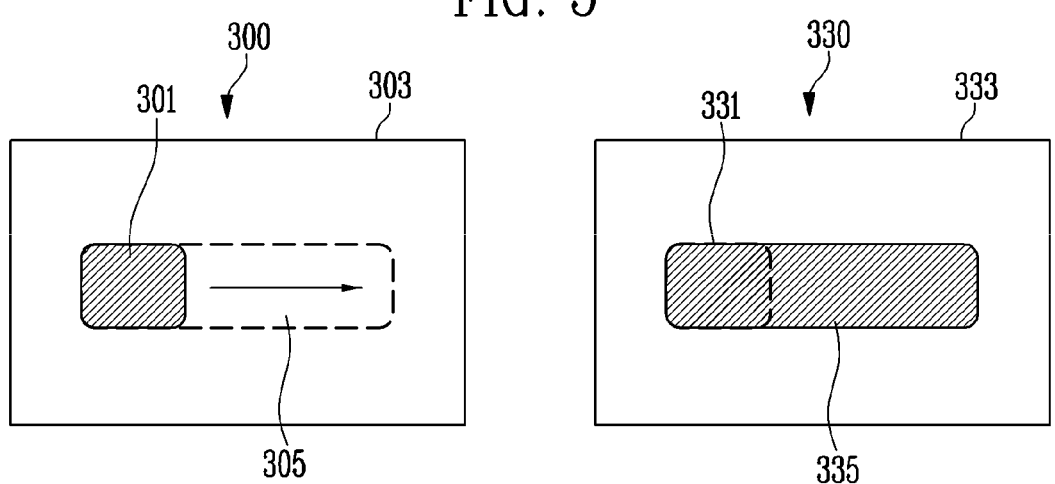
FIG. 5 is a diagram illustrating a super resolution image according to an exposure value in accordance with an embodiment of the present disclosure.

FIG. 5 is a diagram illustrating a super resolution image according to an exposure value in accordance with an embodiment of the present disclosure.

Referring to FIG. 5, the controller 200 may generate a first super resolution image 300 through pixels having the first exposure value EV0 in the pattern image 20. The controller 200 may generate a second super resolution image 330 through pixels having the second exposure value EV1 in the pattern image 20. The pattern image 20 may be an image obtained by photographing an object having a motion in which the object moves to the right.

The first super resolution image 300 may include an area A-1 301, an area B-1 303, and an area C-1 305. The area A-1 301 may be an area occupied by the object for an exposure time, and the area B-1 303 and the area C-1 305 may be a background area which is not occupied by the object for the exposure time.

The second super resolution image 300 may include an area A-2 331, an area B-2 333, and an area C-2 335. The area A-2 331 and the area C-2 335 may be an area occupied by the object for an exposure time, and the area B-2 333 may be a background area which is not occupied by the object for the exposure time.

Positions of the area A-1 301, the area B-1 303, and the area C-1 305 of the first super resolution image 300 may be equal to those of the area A-2 331, the area B-2 333, and the area C-2 335 of the second super resolution image 330.

As an example, the first exposure value EV0 is a value obtained by multiplying an exposure time of 4 ms by a gain value and the second exposure value EV1 is a value obtained by multiplying an exposure time of 32 ms by a gain value. The second exposure value EV1 of the second super resolution image 330 may be greater than the first exposure value EV0 of the first super resolution image 300, and accordingly, a pixel value of the second super resolution image 330 may be greater than that of the first super resolution image 300 with respect to the same area.

For example, when a pixel value included in an area (i.e., the area A-1 301) occupied by the object for the exposure time of 4 ms in the first super resolution image 300 is 100, and a pixel value included in an area (i.e., the area B-1 303 and the area C-1 305) which is not occupied by the object is 50, a pixel value included in an area (i.e., the area A-2 331 and the area C-2 335) occupied by the object for the exposure time 32 ms in the second super resolution image 330 may be 800, and a pixel value included in an area (i.e., the area B-2 333) which is not occupied by the object may be 400. When the area (i.e., the area A-2 331 and the area C-2 335) occupied by the object for the exposure time of 32 ms becomes larger than the area (i.e., the area A-1 area 301) occupied by the object for the exposure time of 4 ms, the pixel value included in the area (i.e., the area A-2 331 and the area C-2 335) occupied by the object in the second super resolution image 330 may decrease with respect to 800.

The controller 200 may generate a motion map representing a motion of the object, based on a ratio of exposure values of pixels at the same position among the plurality of pixels of each of the first super resolution image 300 and the second super resolution image 330 and a ratio of pixel values of the pixels at the same position among the plurality of pixels of each of the first super resolution image 300 and the second super resolution image 330. This will be described in detail with reference to FIGS. 6 to 7B.

Figure 6:
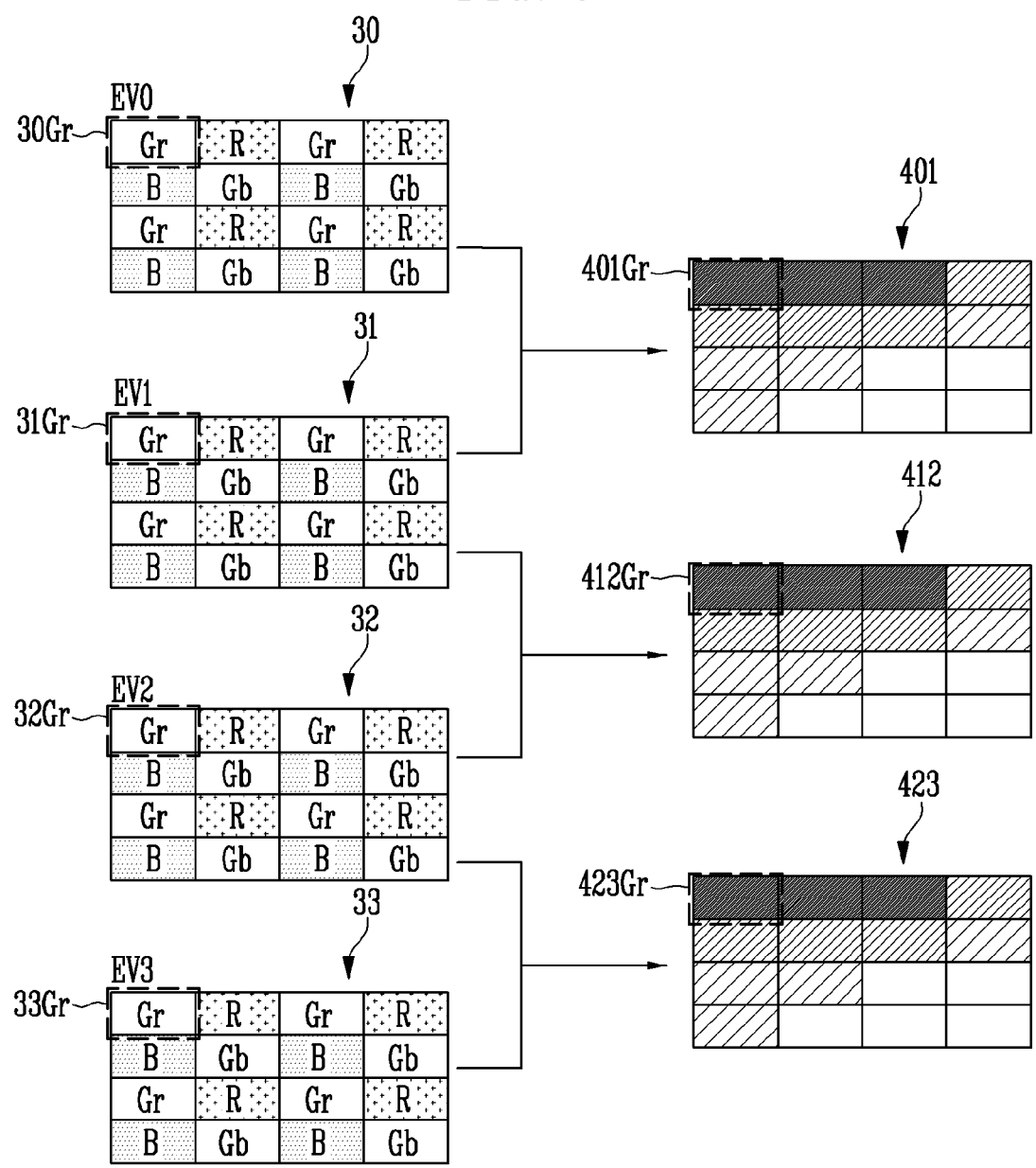
FIG. 6 is a diagram illustrating a motion map in accordance with an embodiment of the present disclosure.

FIG. 6 is a diagram illustrating a motion map in accordance with an embodiment of the present disclosure.

Referring to FIG. 6, the controller 200 may generate motion maps 401, 412, and 423, based on a ratio of exposure values of pixels at the same position among a plurality of pixels of each of a plurality of super resolution images 30, 31, 32, and 33 and a ratio of pixel values of the pixels at the same position among the plurality of pixels of each of the plurality of super resolution images 30, 31, 32, and 33. A method for calculating the motion maps 401, 412, and 423 will be described later together with FIGS. 7A and 7B.

In an embodiment, the plurality of super resolution images 30, 31, 32, and 33 may include a first super resolution image 30, a second super resolution image 31, a third super resolution image 32, and a fourth super resolution image 33.

The controller 200 may generate a first motion map 401, based on the first super resolution image 30 and the second super resolution image 31. The controller 200 may generate a second motion map 412, based on the second super resolution image 31 and the third super resolution image 32. The controller 200 may generate a third motion map 423, based on the third super resolution image 32 and the fourth super resolution image 33.

Hereinafter, an embodiment in which the first motion map 401 is generated based on the first super resolution image 30 and the second super resolution image 31 will be described.

Specifically, the controller 200 may select a first Gr pixel 30Gr and a second Gr pixel 31Gr at a position (1, 1) as the same position in each of the first super resolution image 30 and the second super resolution image 31.

The controller 200 may calculate a ratio of a pixel value of the selected first Gr pixel 30Gr and a pixel value of the second Gr pixel 31Gr. The controller 200 may calculate a ratio of an exposure value EV0 of the selected first Gr pixel 30Gr and an exposure value EV1 of the selected second Gr pixel 31Gr.

The controller 200 may calculate a motion value of a motion cell 401Gr according to the calculated ratio of the exposure values at the position (1, 1) and the calculated ratio of the pixel values at the position (1, 1). The motion cell 401Gr may have the same position (1, 1) the selected first Gr pixel 30Gr and the second Gr pixel 31Gr.

The controller 200 may repeatedly perform the above-described operation on the other pixels at the same position in each of the first super resolution image 30 and the second super resolution image 31. Accordingly, the controller 200 may generate the first motion map 401 including a plurality of motion cells through the first super resolution image 30 and the second super resolution image 31. The plurality of motion cells of the first motion map 401 may have a relationship in which the plurality of motion cells correspond one-to-one to the plurality of pixels of the first super resolution image 30 or the second super resolution image 31. Each of the plurality of motion cells may be mapped to one motion value.

In this manner, the controller 200 may select the second Gr pixel 31Gr and a third Gr pixel 32Gr at the same position in each of the second super resolution image 31 and the third super resolution image 32. The controller 200 may calculate a ratio of the pixel value of the second Gr pixel 31Gr and a pixel value of the third Gr pixel 32Gr, and calculate a ratio of the exposure value EV1 of the second Gr pixel 31Gr and an exposure value EV2 of the third Gr pixel 32Gr. The controller 200 may calculate a motion value of a motion cell 412Gr corresponding to the position of the second Gr pixel 31Gr and the third Gr pixel 32Gr according to the calculated ratio of the pixel values and the calculated ratio of the exposure values. The controller 200 may repeatedly perform the above-described operation on each pixel at the same position of the second super resolution image 31 and the third super resolution image 32. Accordingly, the controller 200 may generate the second motion map 412 including the plurality of motion cell of the motion cell 412Gr, etc. through the second super resolution image 31 and the third super resolution image 32.

In this manner, the controller 200 may select the third Gr pixel 32Gr and a fourth Gr pixel 33Gr at the same position in each of the third super resolution image 32 and the fourth super resolution image 33. The controller 200 may calculate a ratio of the pixel value of the third Gr pixel 32Gr and a pixel value of the fourth Gr pixel 33Gr, and calculate a ratio of the exposure value EV2 of the third Gr pixel 32Gr and an exposure value EV3 of the fourth Gr pixel 33Gr. The controller 200 may calculate a motion value of a motion cell 423Gr corresponding to the position of the third Gr pixel 32Gr and the fourth Gr pixel 33Gr according to the calculated ratio of the pixel values and the calculated ratio of the exposure values. The controller 200 may repeatedly perform the above-described operation on each pixel at the same position of the third super resolution image 32 and the fourth super resolution images 33. Accordingly, the controller 200 may generate the third motion map 423 including a plurality of motion cells of the motion cell 423Gr, etc. through the third super resolution image 32 and the fourth super resolution images 33.

FIG. 7A is a diagram illustrating a method for calculating an exposure ratio in accordance with an embodiment of the present disclosure.

Referring to FIG. 7A, the controller 200 may calculate an exposure ratio ER through a ratio of exposure values of pixels at the same position between a plurality of super resolution images 30, 31, 32, and 33 and a ratio of pixel values of the pixels at the same position between the plurality of super resolution images 30, 31, 32, and 33. The exposure ratio ER may represent a ratio of a ratio of pixel values to a ratio of exposure values between pixels at the same position among a plurality of pixels of each of the plurality of super resolution images 30, 31, 32, and 33. The exposure ratio may be used to calculate a motion value of a motion map.

For example, a case where the Gr pixels 30Gr and 31Gr at the position (1, 1) are selected among the plurality of pixels included in the first super resolution image 30 and the second super resolution image 31, which are shown in FIG. 6, will be used as an example. The exposure value of the Gr pixel 30Gr at the position (1, 1) of the first super resolution image 30 is EV0(1, 1), and the pixel value of the Gr pixel 30Gr at the position (1, 1) of the first super resolution image 30 is Pixel_EV0(1, 1). In addition, the exposure value of the Gr pixel 31Gr at the position (1, 1) of the second super resolution image 31 is EV1(1, 1), and the pixel value of the Gr pixel 31Gr at the position (1, 1) of the second super resolution image 31 is Pixel_EV1(1, 1).

The controller 200 may calculate ER01(1, 1) by putting the above-described values into an equation shown in (1) of FIG. 7A. ER01(1, 1) may represent an exposure ratio calculated through the Gr pixels 30Gr and 31Gr at the position (1, 1) of the first super resolution image 30 and the second super resolution image 31.

The controller 200 may calculate the other exposure ratio through the equation shown in (1) of FIG. 7A with respect to the other pixels included in the first super resolution image 30 and the second super resolution image 31.

In this manner, the controller 200 may calculate an exposure ratio through an equation shown in (2) of FIG. 7A with respect to each of a plurality of pixels included in the second super resolution image 31 and the third super resolution image 32. The controller 200 may calculate an exposure ratio through an equation shown in (3) of FIG. 7A with respect to each of a plurality of pixels included in the third super resolution image 32 and the fourth super resolution image 33.

FIG. 7B is a diagram illustrating a method for generating a motion map in accordance with an embodiment of the present disclosure.

Referring to FIG. 7B, the controller 200 may calculate a motion value by using an exposure ratio.

For example, the Gr pixels 30Gr and 31Gr at the position (1, 1) are selected among the plurality of pixels included in the first super resolution image 30 and the second super resolution image 31, which are shown in FIG. 6. The exposure ratio may be ER01(1, 1). The controller 200 may calculate an absolute value obtained by subtracting 1 from ER01(1, 1) through an equation shown in (1) of FIG. 7B and determine a smaller number as the motion value M01(1, 1) by comparing the calculated absolute value with 1. M01(1, 1) is a motion value calculated through the Gr pixels 30Gr and 31Gr at the position (1, 1) of the first super resolution image 30 and the second super resolution image 31 and represent a motion value of a motion cell at the position (1, 1).

The controller 200 may calculate the other motion value through the equation shown in (1) of FIG. 7B with respect to the other pixels included in the first super resolution image 30 and the second super resolution image 31. Accordingly, the first motion map 401 includes the plurality of calculated motion values.

In this manner, the controller 200 may generate the second motion map 412 through equations shown in (2) of FIG. 7A and (2) of FIG. 7B with respect to each of the plurality of pixels included in the second super resolution image 31 and the third super resolution image 32. The controller 200 may generate the third motion map 423 through equations shown in (3) of FIG. 7A and (3) of FIG. 7B with respect to each of the plurality of pixels included in the third super resolution image 32 and the fourth super resolution image 33.

Figure 8:
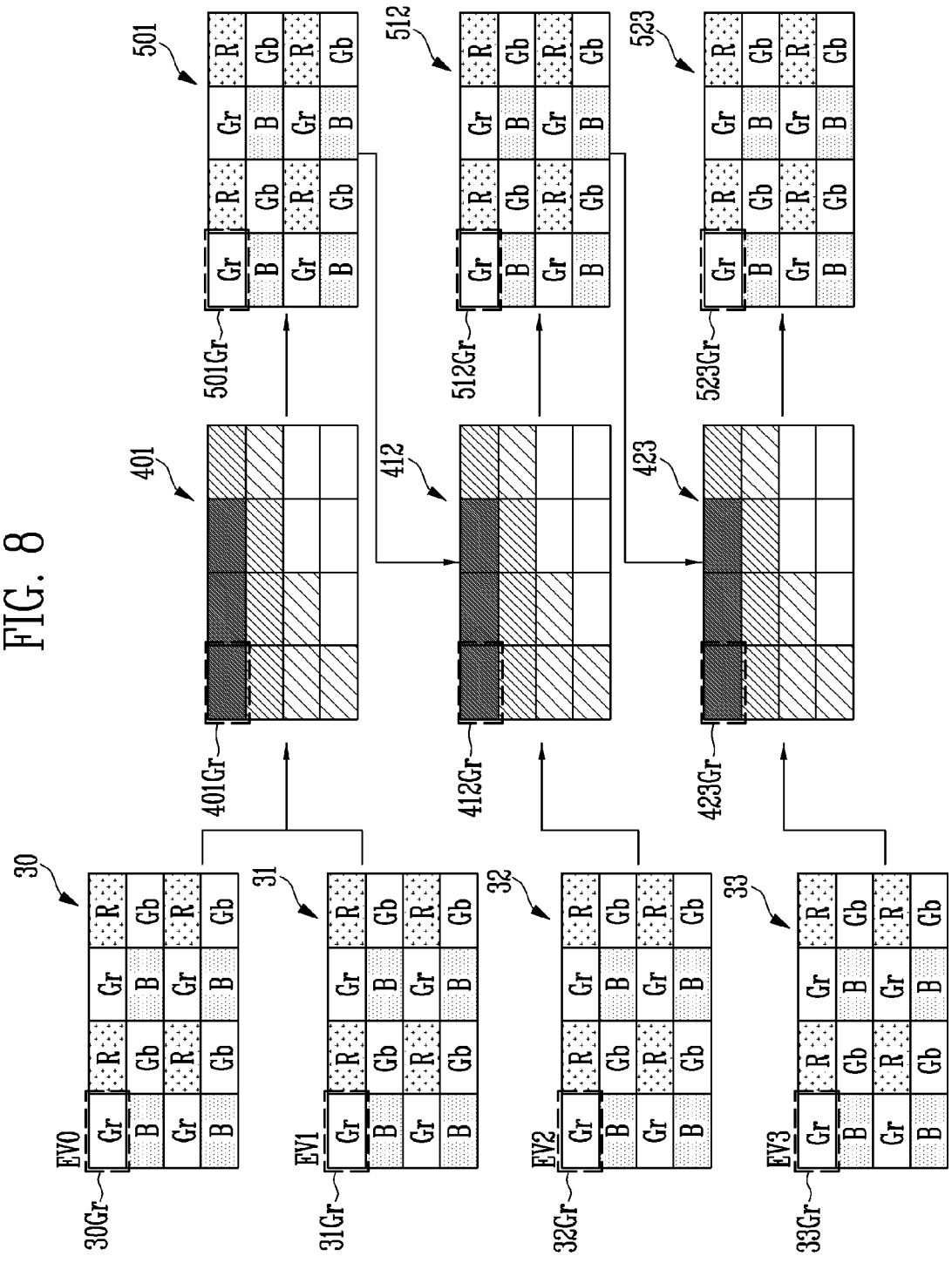
FIG. 8 is a diagram illustrating a target image in accordance with an embodiment of the present disclosure.

FIG. 8 is a diagram illustrating a target image in accordance with an embodiment of the present disclosure.

Referring to FIG. 8, the controller 200 may generate target images 501, 512, and 523 according to weighted sums of a plurality of super resolution images 30, 31, 32, and 33 and motion maps 401, 412, and 423.

In an embodiment, a plurality of super resolution images 30, 31, 32, and 33 may include a first super resolution image 30, a second super resolution image 31, a third super resolution image 32, and a fourth super resolution image 33. In addition, the controller 200 may generate a first motion map 401, based on the first super resolution image 30 and the second super resolution image 31. The controller 200 may generate a second motion map 412, based on the second super resolution image 31 and the third super resolution image 32. The controller 200 may generate a third motion map 423, based on the third super resolution image 32 and the fourth super resolution image 33.

The controller 200 may generate a first target image 501 according to a weighted sum using the first motion map 401 as a weight of the first super resolution image 30 and the second super resolution image 31.

Also, the controller 200 may generate a second target image 512 according to a weighted sum using the second motion map 412 as a weight of the first target image 501 and the third super resolution image 32. Also, the controller 200 may generate a third target image 523 according to a weighted sum using the third motion map 423 as a weight of the second target image 512 and the fourth super resolution image 33.

The controller 200 may output the third target image 523 as a finally generated target image to an external device. The external device refers to a device located at the outside of the controller 200, and may be a display device or a storage device. The finally generated target image may be displayed through the display device or be stored in the storage device.

Figures 9, 10:
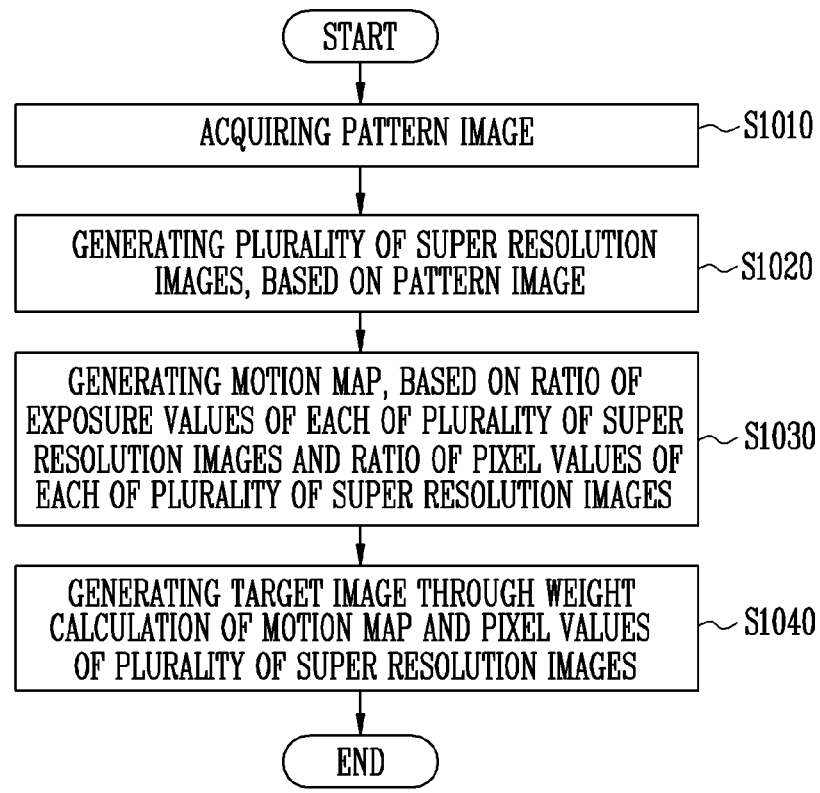
FIG. 9 is a diagram illustrating a method for generating a target image in accordance with an embodiment of the present disclosure.
FIG. 10 is a diagram illustrating an operating method of the image processing device in accordance with an embodiment of the present disclosure.

FIG. 9 is a diagram illustrating a method for generating a target image in accordance with an embodiment of the present disclosure.

Referring to FIGS. 8 and 9, the controller 200 may generate the target images 501, 512, and 523 according to the weighted sums of the plurality of super resolution images 30, 31, 32, and 33 and the motion maps 401, 412, and 423. Equation (1) of FIG. 9 represents an equation corresponding to the first target image 501, equation (2) of FIG. 9 represents an equation corresponding to the second target image 512, and equation (3) of FIG. 9 represents an equation corresponding to the third target image 523. Here, each of i and j is a natural number.

Referring to (1) of FIG. 9, the controller 200 may generate the first target image according to the weighted sum using the first motion map 401 as the weight of the first super resolution image 30 and the second super resolution image 31, with respect to each of pixels and motion cells at the same position.

For example, this will be described based on the position (1, 1). The pixel value of the Gr pixel 30Gr at the position (1, 1) of the first super resolution image 30 is Pixel_EV0(1, 1), and the exposure value of the Gr pixel 30Gr at the position (1, 1) of the first super resolution image 30 is EV0(1, 1). The pixel value of the Gr pixel 31Gr at the position (1, 1) of the second super resolution image 31 is Pixel_EV1(1, 1), and the exposure value of the Gr pixel 31Gr at the position (1, 1) of the second super resolution image 31 is EV1(1, 1). The motion value of the motion cell 401Gr at the position (1, 1) of the first motion map 401 is M01(1, 1).

The controller 200 may calculate IMG_EV01(1, 1) by putting Pixel_EV0(1, 1), EV0(1, 1), Pixel_EV1(1, 1), EV1(1, 1), and M01(1, 1) into the equation shown in (1) of FIG. 9. IMG_EV01(1, 1) may represents a pixel value of a Gr pixel 501Gr at the position (1, 1) of the first target image 501.

Also, the controller 200 may calculate pixel values of the other pixels at another position among a plurality of pixels to be included in the first target image 501 through the equation shown in (1) of FIG. 9. The controller 200 may generate the first target image 501 through a plurality of calculated pixel values. The first target image 501 may include a plurality of pixels, and the plurality of calculated pixel values may be mapped to the plurality of pixels according to positions.

In this manner, the controller 200 may generate the second target image 512 according to the weighted sum using the second motion map 412 as the weight of the first target image 501 and the third super resolution image 32, with respect to pixels and motion cells at the same position.

For example, this will be described based on the position (1, 1). The exposure value of the Gr pixel 31Gr at the position (1, 1) of the second super resolution image 31 is EV1(1, 1). The pixel value of the Gr pixel 32Gr at the position (1, 1) of the third super resolution image 32 is Pixel_EV2(1, 1), and the exposure value of the Gr pixel 32Gr at the position (1, 1) of the third super resolution image 32 is EV2(1, 1). The motion value of the motion cell 412Gr at the position (1, 1) of the second motion map 412 is M12(1, 1). The pixel value of a pixel at the position (1, 1) of the first target image 501 is IMG_EV01(1, 1).

The controller 200 may calculate IMG_EV12(1, 1) by putting IMG_EV01(1, 1), EV1(1, 1), Pixel_EV2(1, 1), EV2(1, 1), and M12(1, 1) into the equation shown in (2) of FIG. 9. The IMG_EV12(1, 1) may represent a pixel value of a Gr pixel 512Gr at the position (1, 1) of the second target image 512.

Also, the controller 200 may calculate pixel values of the other pixels at another position among a plurality of pixels to be included in the second target image 512 through the equation shown in (2) of FIG. 9. The controller 200 may generate the second target image 512 through a plurality of calculated pixel values. The second target image 512 may include a plurality of pixels, and the plurality of calculated pixel values may be mapped to the plurality of pixels according to positions.

In this manner, the controller 200 may generate the third target image 523 according to the weighted sum using the third motion map 423 as the weight of the second target image 512 and the fourth super resolution image 33. That is, the controller 200 may calculate a pixel value of each of a plurality of pixels to be included in the third target image 523 through the equation shown in (3) of FIG. 9. The controller 200 may generate the third target image 523 through a plurality of calculated pixel values. The third target image 523 may include a plurality of pixels, and the plurality of calculated pixel values may be mapped to the plurality of pixels according to positions.

The controller 200 may determine the last generated third target image 523 as an output image, and the third target image 523 may be output to the external device.

FIG. 10 is a diagram illustrating an operating method of the image processing device in accordance with an embodiment of the present disclosure.

Referring to FIG. 10, the operating method of the image processing device in accordance with the embodiment of the present disclosure may include operation S1010 of acquiring a pattern image 20 including a pixel value of each of a plurality of pixels and an exposure value representing an exposure time for which the pixel value is acquired, operation S1020 of generating a plurality of super resolution images 30, 31, 32, and 33, based on pixels having the same exposure value among the plurality of pixels included in the pattern image 20, operation S1030 of generating a motion map representing a motion of an object, based on a ratio of exposure values of pixels at a selected position among a plurality of pixels included in the plurality of super resolution images 30, 31, 32, and 33 and a ratio of pixel values of the pixels at the selected position among the plurality of pixels included in the plurality of super resolution images 30, 31, 32, and 33, and operation S1040 of outputting a target image according to weighted sums of the plurality of super resolution images 30, 31, 32, and 33 and the motion map.

Specifically, the pattern image 20 may be acquired, which includes a pixel value of each of a plurality of pixels and an exposure value representing an exposure time for which the pixel value is acquired (S1010).

In an embodiment, the pattern image 20 may include a plurality of local areas in which pixels having different exposure values among the plurality of pixels are respectively arranged.

In an embodiment, the operation of generating the plurality of super resolution images 30, 31, 32, and 33 may include an operation of extracting pixels having the same exposure value in each of the plurality of local areas of the pattern image 20 and an operation of generating the plurality of super resolution images 30, 31, 32, and 33 in which the extracted pixels are alternately arranged according to colors.

In addition, the plurality of super resolution images 30, 31, 32, and 33 may be generated based on pixels having the same exposure value among the plurality of pixels included in the pattern image 20 (S1020).

In addition, a motion map representing a motion of an object may be generated based on a ratio of exposure values of pixels at a selected position among the plurality of pixels included in the plurality of super resolution images 30, 31, 32, and 33 and a ratio of pixels values of the pixels at the selected position among the plurality of pixels included in the plurality of super resolution images 30, 31, 32, and 33 (S1030).

In addition, a target image may be output according to a weighted sum of the plurality of super resolution images 30, 31, 32, and 33 and the motion map (S1040).

Figure 11:
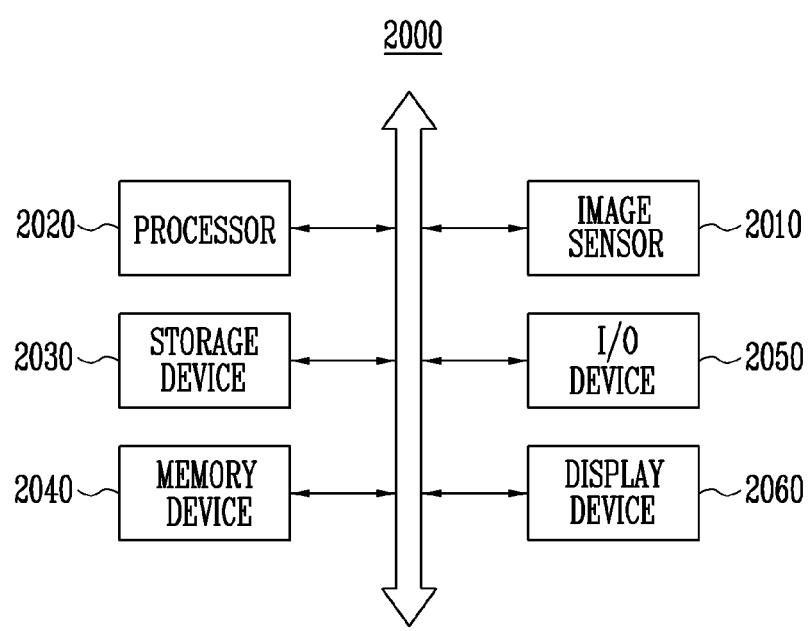
FIG. 11 is a diagram illustrating a computing system including the image processing device in accordance with an embodiment of the present disclosure.

FIG. 11 is a diagram illustrating a computing system 2000 including the image processing device in accordance with an embodiment of the present disclosure.

Referring to FIG. 11, the computing system 2000 may include an image sensor 2010, a processor 2020, a storage device 2030, a memory device 2040, an input/output (I/O) device 2050, and a display device 2060. Although not shown in FIG. 11, the computing system 2000 may further include a port which may communicate with the storage device 2030, the memory device 2040, the I/O device 2050, and the display device 2060, and the like, or communicate with an external device.

The image sensor 2010 may acquire a pattern image. The image sensor 2010 may be connected to the processor 2020 through an address bus, a control bus, and a data bus, or a communication link different therefrom, to perform communication. Descriptions of the above-described image sensor 100 may be applied to the image sensor 2010.

The image sensor 2010 may be implemented with various types of packages. For example, at least some components of the image sensor 2010 may be implemented by using packages such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi-Chip Package (MCP), Wafer-level Fabricated Package (WFP), or Wafer-level processed Stack Package (WSP). In some embodiments, the image sensor 2010 may be integrated together with the processor 2020 in one chip, or the image sensor 2010 and the processor 2020 may be integrated in different chips.

The processor 2020 may control overall operations of the computing system 2000. The processor 2020 may generate a target image by using a pattern image. The processor 2020 may control the display device 2060 to display the pattern image or the target image. The processor 2020 may store the pattern image or the target image in the storage device 2030. Descriptions of the above-described controller 200 may be applied to the processor 2020.

The processor 2020 may perform specific calculations or tasks. In accordance with an embodiment of the present disclosure, the processor 2020 may include at least one of a Central Processing Unit (CPU), an Application Processing Unit (APU), a Graphic Processing Unit (GPU), and the like.

The processor 2020 may be connected to the storage device 2030, the memory device 2040, and the I/O device 2050 through the address bus, the control bus, and the data bus, to perform communication. In accordance with an embodiment of the present disclosure, the processor 2020 may also be connected to an expansion bus such as a Peripheral Component Interconnect (PCI) bus.

The storage device 2030 may store data such as an image. The data stored in the storage device 2030 may be preserved not only when the computing system 2000 is driven but also when the computing system 2000 is not driven. For example, the storage device 2030 may be configured with at least one of nonvolatile memory devices such as a flash memory device, a Solid State Drive (SSD), a Hard Disk Drive (HDD), and an optical disk.

The memory device 2040 may store data such as an image. The data stored in the memory device 2040 may be preserved only when the computing system 2000 is driven. Alternatively, the data stored in the memory device 2040 may be preserved not only when the computing system 2000 is driven but also when the computing system 2000 is not driven. For example, the memory device 2040 may include volatile memory devices such as a Dynamic Random Access Memory (DRAM) and a Static Random Access Memory (SRAM), and nonvolatile memory devices such as an Erasable Programmable Read Only Memory (EPROM), an Electrically Erasable Programmable Read Only Memory (EEPROM), and a flash memory device.

The I/O device 2050 may include an input device and an output device. The input device is a device capable of inputting a command of a user through interaction, and may be implemented as, for example, a keyboard, a keypad, a mouse, a microphone, or the like. The output device is a device capable of outputting data, and may be implemented as a printer, a speaker, or the like.

The display device 2060 is a device for visually outputting data such as an image. To this end, the display device 2060 may be implemented with various types of displays such as a Liquid crystal Display (LCD) for controlling the molecular arrangement of liquid crystals, using a separate backlight unit (e.g., a light emitting diode (LED), etc.) as a light source, thereby adjusting a degree to which light emitted from the backlight unit is transmitted through the liquid crystals (brightness of light or intensity of light), and a display using, without a light source, a self-luminous element (e.g., a mini LED having a size of 100 to 200 μm, a micro LED having a size of 100 μm or less, an Organic LED (OLED), a Quantum dot LED (QLED), and the like).

The display device 2060 may include a plurality of pixels. The plurality of pixels of the display device 2060 may have a position relationship in which the plurality of pixels correspond to a plurality of pixels of an image. The plurality of pixels of the display device 2060 may display an image by emitting light with a luminance corresponding to a pixel value of each of the plurality of pixels of the image. The display device 2060 may include a plurality of driving circuits corresponding to the plurality of pixels. The driving circuit may be implemented in the form of an amorphous silicon (a-Si) thin film transistor (TFT), a low temperature poly-silicon (LTPS) TFT, an organic TFT (OTFT), or the like.

In an embodiment, the display device 2060 may be implemented as a flexible display having a characteristic in which the shape of the display device 2060 is bendable and can be restored. In an embodiment, the display device 2060 may be implemented as a transparent display having a characteristic in which light is transmitted therethrough. In an embodiment, the display device 2060 may be coupled to a touch sensor for identifying a position at which a user touches the display device 2060 to be implemented as a touch display.

In accordance with the present disclosure, there may be provided an image processing device for generating an image by distinguishing an area in which a motion occurs and an area in which the motion does not occur from each other.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Various embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. An image processing device comprising:
an image sensor configured to acquire a pixel value for each of a plurality of pixels; and
a controller configured to:
acquire a pattern image including the pixel value of each of the plurality of pixels and an exposure value representing an exposure time for which the pixel value is acquired;
generate a plurality of super resolution images based on pixels having the same exposure value among the plurality of pixels included in the pattern image;
generate a motion map, which represents a motion of an object, based on a ratio of exposure values of pixels at a selected position among a plurality of pixels included in the plurality of super resolution images and a ratio of pixel values of the pixels at the selected position among the plurality of pixels included in the plurality of super resolution images; and generate a target image according to a weighted sum of the plurality of super resolution images and the motion map.

2. The image processing device of claim 1, wherein the pattern image includes a plurality of local areas in each of which pixels having different exposure values among the plurality of pixels are arranged.

3. The image processing device of claim 2, wherein the controller generates the super resolution images by:

extracting pixels having the same exposure value in each of the plurality of local areas of the pattern image; and alternately arranging the extracted pixels according to a color.

4. The image processing device of claim 1, wherein the controller includes a super resolution image generator configured to:

extract pixels having a first exposure value and pixels having a second exposure value among the plurality of pixels included in the pattern image;

generate, among the plurality of super resolution images, a first super resolution image including a first plurality of pixels having the first exposure value and alternately arranged according to a color; and generate, among the plurality of super resolution images, a second super resolution images including a second plurality of pixels having the second exposure value and alternately arranged according to a color.

5. The image processing device of claim 4, wherein the controller further includes a motion map generator configured to:

calculate a motion value at the selected position based on the ratio of exposure values of pixels at the selected position among the first plurality of pixels included in the first super resolution image and the second plurality of pixels included in the second super resolution image and the ratio of pixel values of the pixels at the selected position among the first plurality of pixels included in the first super resolution image and the second plurality of pixels included in the second super resolution image, and generate the motion map including the calculated motion value.

6. The image processing device of claim 5, wherein the controller further includes a target image generator configured to:

calculate a weighted sum of the pixel values of the pixels at the selected position among the first plurality of pixels and the second plurality of pixels, and a motion value corresponding to the selected position among a plurality of motion values; and generate the target image by mapping the weighted sum at the selected position to a pixel value of a pixel at the selected position among a plurality of pixels included in the target image.

7. The image processing device of claim 5, wherein the motion map generator is configured to calculate, when at least one of the pixels at the selected position among the first plurality of pixels and the second plurality of pixels is saturated, the motion value at the selected position as a value of 0.

8. The image processing device of claim 1, wherein the pattern image includes a plurality of local areas in which pixels representing the same color among the plurality of pixels are arranged in an n×n array where n is an integer greater than 0.

9. The image processing device of claim 1, wherein each of the plurality of super resolution images is an image having a resolution higher than that of the pattern image.

10. The image processing device of claim 1, wherein the controller includes a super resolution image generator configured to generate the plurality of super resolution images through a super resolution technique based on pixels having the same exposure value among the plurality of pixels included in the pattern image, and wherein the super resolution technique includes at least one of a bilinear interpolation technique, a bicubic interpolation technique, and a deep learning-based convolution neural network.

11. A method for operating an image processing device, the method comprising:

acquiring a pattern image including a pixel value of each of a plurality of pixels and an exposure value representing an exposure time for which the pixel value is acquired;

generating a plurality of super resolution images based on pixels having the same exposure value among the plurality of pixels included in the pattern image;

generating a motion map, which represents a motion of an object, based on a ratio of exposure values of pixels at a selected position among a plurality of pixels included in the plurality of super resolution images and a ratio of pixel values of the pixels at the selected position among the plurality of pixels included in the plurality of super resolution images; and generating a target image according to a weighted sum of the plurality of super resolution images and the motion map.

12. The method of claim 11, wherein the pattern image includes a plurality of local areas in each of which pixels having different exposure values among the plurality of pixels are arranged.

13. The method of claim 12, wherein the generating of the plurality of super resolution images includes:

extracting pixels having the same exposure value in each of the plurality of local areas of the pattern image; and alternately arranging the extracted pixels according to a color.

14. The method of claim 11, wherein the generating of the plurality of super resolution images includes:

extracting pixels having a first exposure value and pixels having a second exposure value among the plurality of pixels included in the pattern image;

generating, among the plurality of super resolution images, a first super resolution image including a first plurality of pixels having the first exposure value and alternately arranged according to a color; and generating, among the plurality of super resolution images, a second super resolution images including a second plurality of pixels having the second exposure value and alternately arranged according to a color.

15. The method of claim 14, wherein the generating of the motion map includes:

calculating a motion value at the selected position based on the ratio of exposure values of pixels at the selected position among the first plurality of pixels included in the first super resolution image and the second plurality of pixels included in the second super resolution image and the ratio of pixel values of the pixels at the selected position among the first plurality of pixels included in the first super resolution image and the second plurality of pixels included in the second super resolution image; and generating the motion map including the calculated motion value.

16. The method of claim 15, wherein the generating the target image includes:
   calculating a weighted sum of the pixel values of the pixels at the selected position among the first plurality of pixels and the second plurality of pixels, and a motion value corresponding to the selected position among a plurality of motion values; and
   generating the target image by mapping the weighted sum at the selected position to a pixel value of a pixel at the selected position among a plurality of pixels included in the target image.

17. The method of claim 15, wherein the motion value at the selected position is calculated as a value of 0 when at least one of the pixels at the selected position among the first plurality of pixels and the second plurality of pixels is saturated.

18. The method of claim 11, wherein the pattern image includes a plurality of local areas in which pixels representing the same color among the plurality of pixels are arranged in an n×n array, where n is an integer greater than 0.

19. The method of claim 11, wherein each of the plurality of super resolution images is an image having a resolution higher than that of the pattern image.

20. The method of claim 11,
   wherein the plurality of super resolution images are generated through a super resolution technique based on pixels having the same exposure value among the plurality of pixels included in the pattern image, and
   wherein the super resolution technique includes at least one of a bilinear interpolation technique, a bicubic interpolation technique, and a deep learning-based convolution neural network.

\* \* \* \* \*